(12) United States Patent
Ichihashi et al.

(10) Patent No.: US 7,720,143 B2
(45) Date of Patent: May 18, 2010

(54) SIGNAL PROCESSING APPARATUS

(75) Inventors: Nobuharu Ichihashi, Hiratsuka (JP);
Eito Sakakima, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1448 days.

(21) Appl. No.: 10/994,329

(22) Filed: Nov. 23, 2004

(65) Prior Publication Data

US 2005/0135786 A1 Jun. 23, 2005
US 2009/0285547 A2 Nov. 19, 2009

(30) Foreign Application Priority Data

Nov. 26, 2003 (JP) .............................. 2003-395348
Nov. 19, 2004 (JP) .............................. 2004-335402

(51) Int. Cl.
*H04N 11/02* (2006.01)

(52) U.S. Cl. .................................. 375/240.01; 370/916

(58) Field of Classification Search ............... 725/38–4, 725/586; 386/46, 83, 124; 360/48; 713/164; 375/240.01
See application file for complete search history.

(56) References Cited

U.S. PATENT DOCUMENTS

| | | | | |
|---|---|---|---|---|
| 5,296,931 A | * | 3/1994 | Na ............................. | 725/38 |
| 5,418,658 A | * | 5/1995 | Kwon .......................... | 360/48 |
| 5,583,889 A | * | 12/1996 | Citta et al. .................. | 375/341 |
| 5,614,952 A | | 3/1997 | Boyce et al. ................ | 348/392 |
| 5,635,985 A | | 6/1997 | Boyce et al. ................ | 348/402 |
| 5,646,686 A | | 7/1997 | Pearlstein ................... | 348/392 |
| 5,828,417 A | * | 10/1998 | Itagaki et al. ............... | 725/58 |
| 5,838,383 A | | 11/1998 | Chimoto et al. | |
| 6,115,080 A | * | 9/2000 | Reitmeier ................... | 348/731 |
| 7,010,685 B1 | * | 3/2006 | Candelore ................... | 713/164 |
| 2004/0146280 A1 | | 7/2004 | Hasegawa et al. | |
| 2004/0151475 A1 | * | 8/2004 | Taira et al. ................... | 386/95 |

FOREIGN PATENT DOCUMENTS

| | | |
|---|---|---|
| JP | 07-336620 | 12/1995 |
| JP | 8-79641 | 3/1996 |
| JP | 08-205161 | 8/1996 |
| JP | 9-9166 | 1/1997 |
| JP | 2001-024533 | 1/2001 |

OTHER PUBLICATIONS

U.S. Appl. No. 09/537,872, filed Mar. 29, 2000, Nobuhiro Hoshi, Nobuharu Ichihashi, Tomoyuki Ohno.
U.S. Appl. No. 10/954,418, filed Oct. 1, 2004, Noriyuki Yoshigahara, Nobuharu Ichihashi.

* cited by examiner

*Primary Examiner*—Thai Tran
*Assistant Examiner*—Mishawn Dunn
(74) *Attorney, Agent, or Firm*—Fitzpatrick, Cella, Harper & Scinto

(57) ABSTRACT

The present application discloses a signal processing apparatus. Particularly, it discloses a signal processing apparatus comprising a first decoder for generating video data by decoding data and a second decoder for generating video data by decoding data, wherein, regarding predetermined operations for generating the video data by decoding the data, the number of the predetermined operations that can be executed by the second decoder for each unit time is lower than that of the predetermined operations that can be executed by the first decoder for each unit time.

3 Claims, 9 Drawing Sheets

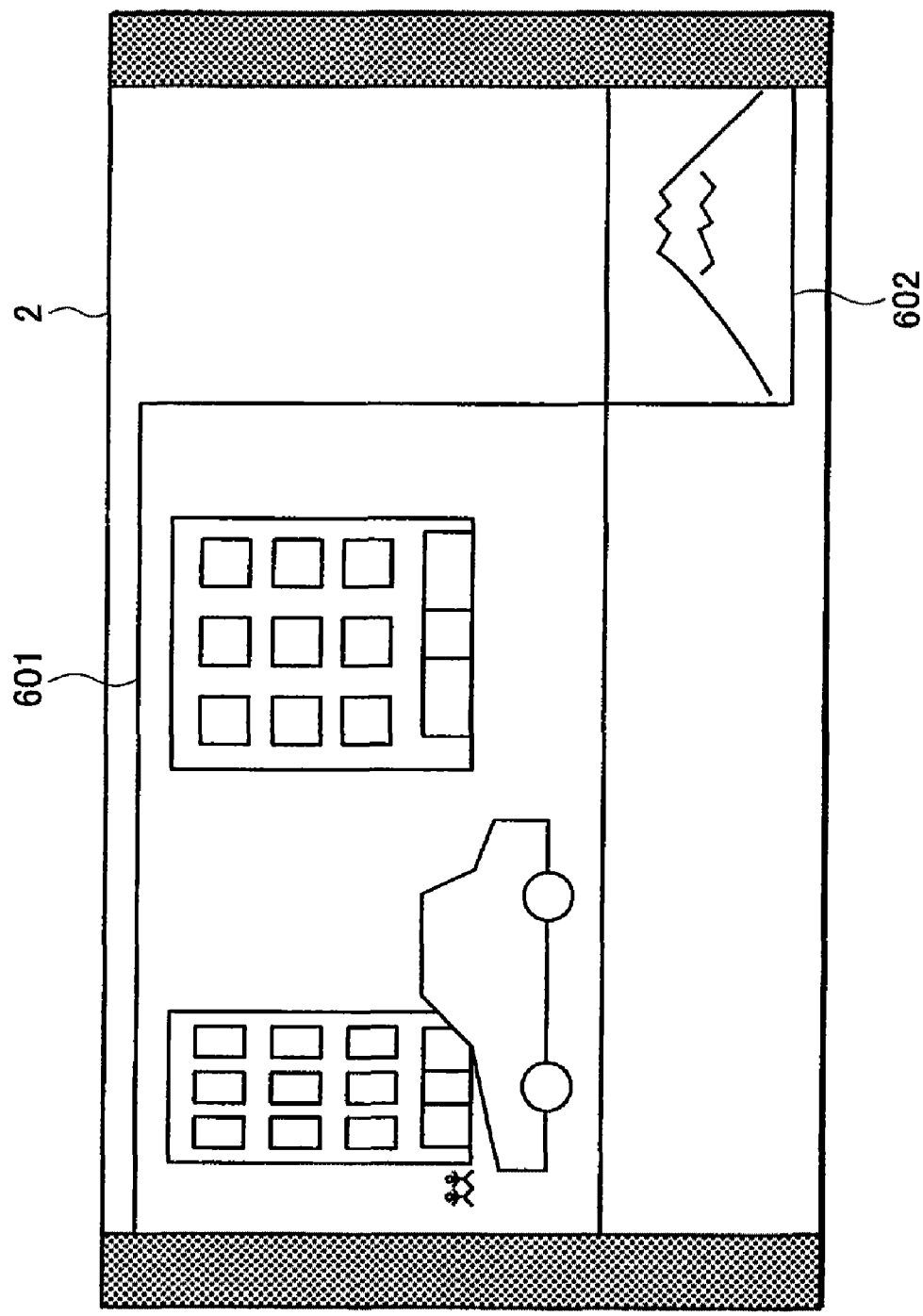

SIGNAL PROCESSING APPARATUS

BACKGROUND OF THE INVENTION

1. Field of the Invention

The present invention relates to a signal processing apparatus.

2. Description of the Related Art

Television broadcast receivers with two tuners capable of displaying two programs at a time are known. Examples of such receivers are described in Japanese Laid-Open Patent Publication (Kokai) No. H9-9166 (1997-9166). In addition, Japanese Laid-Open Patent Publication (Kokai) No. H8-79641 (1996-79641) discloses a television receiver having a plurality of processing modules.

SUMMARY OF THE INVENTION

It is an object of the present invention to provide an apparatus that can simplify presenting a display using a plurality of display areas. It is another object to provide an apparatus capable of presenting a high-definition display using a plurality of display areas.

According to one aspect of the present invention, a signal processing apparatus includes a first decoder for generating video data by decoding data, and a second decoder for generating video data by decoding data. Regarding predetermined operations for generating the video data by decoding the data, the number of the predetermined operations that can be executed by the second decoder for each unit time is lower than that of the predetermined operations that can be executed by the first decoder for each unit time.

For example, by decreasing resolution of the video data output from the second decoder so as to be lower than resolution of the video data output from the first decoder, it becomes possible to decrease the number of predetermined operations related to decoding such as, for example, inverse DCT processing. Due to the decrease in the number of the operations for presenting a single screen, the number of the operations per unit time (one second) of the second decoder can be lower than that of the first decoder.

Furthermore, in the present invention, the signal processing apparatus preferably includes a first demultiplexer for identifying and picking out plural types of data from sequentially input packet data according to identifiers of the packet data, and a second demultiplexer for identifying and picking out fewer types of data than the plural types of data from sequentially input packet data according to identifiers of the packet data. The first decoder decodes the data picked out by the first demultiplexer and the second decoder decodes the data picked out by the second demultiplexer.

Data not picked up by the second demultiplexer may be discarded.

Preferably, the signal processing apparatus of the present invention further includes a receiver for receiving data input to the first decoder and/or the second decoder. Particularly, the receiver preferably includes a receiving circuit for receiving the data decoded by the first decoder and a receiving circuit for receiving the data decoded by the second decoder.

A signal received by the receiver may be stored in a temporary storage device before it is input to the decoder. If a demultiplexer is used as described in the embodiment below, a signal received by the receiver may be stored in the temporary storage device before it is input to the decoder via the demultiplexer. The storage device is only required to store necessary data for signal processing of a decoder or a demultiplexer for a required period, and therefore it is only necessary to have a storage capacity of, for example, one to several frames. In addition, it is also possible to pre-store a program in the storage device and to input data from the storage device to the first decoder (and/or the first demultiplexer) or to the second decoder (and/or the second demultiplexer). In this situation, the storage device needs to have enough capacity to store the program, preferably at least 1 gigabyte. Furthermore, data read from a recording medium such as a DVD can be input to the first decoder (and/or the first demultiplexer) or the second decoder (and/or the second demultiplexer).

According to another aspect of the present invention, a signal processing apparatus includes a first demultiplexer for identifying and picking out plural types of data from packet data sequentially input to the apparatus according to identifiers of the packet data, and a second demultiplexer for identifying and picking out fewer types of data than the first demultiplexer picked out from the plural types of data from the packet data sequentially input to the apparatus according to identifiers of the packet data.

According to still another aspect of the present invention, a signal processing apparatus includes a signal processing circuit, and a storage device for storing a program for performing processing to generate video data by decoding data in the signal processing circuit. The program performs a first processing step to generate video data for display in a first display area among displayable areas of a display device, and a second processing step to generate video data for display in a second display area not identical to the first display area. In performing predetermined operations in the first and second processing steps, the number of the predetermined operations per unit time executed to generate the video data for display in the second display area is less than the number of the predetermined operations per unit time executed to generate the video data for display in the first display area.

With these features, preferably the first display area is larger than the second display area.

According to still another aspect of the invention, a signal processing apparatus includes a signal processing circuit, and a storage device for storing a program for performing processing to generate video data by decoding input data in the signal processing circuit. The program is prepared to enable switching between a first state of performing processing to generate video data for display in a predetermined display area among displayable areas of a display device, and a second state of performing processing to generate video data for display in a first display area among the displayable areas and processing to generate video data for display in a second display area not identical to the first display area.

In the above, the predetermined display area can be identical to the displayable area. Furthermore, one of the first display area and the second display area can be identical to the displayable area.

In the present invention, regarding predetermined operations for generating the video data by decoding the input data, preferably both of the number of the predetermined operations per unit time executed in generating the video data for display in the first display area and the number of the predetermined operations per unit time executed in generating the video data for display in the second display area are less than the number of the predetermined operations per unit time executed in generating the video data for display in the predetermined display area.

Particularly, the program preferably includes a first program for performing processing to generate the video data for display in the predetermined display area among the displayable areas of the display device and a second program for performing processing to generate the video data for display in the second display area not identical to the first display area. The first state and the second state can be switched by switching between the state of executing the first program and the state of executing the second program.

According to another aspect of the present invention, a signal processing apparatus includes a signal processing circuit for generating video data by decoding the data, and a storage device for storing rewritten data for changing an operational state of the signal processing circuit. The signal processing circuit can be switched between a first state for performing processing to generate video data for display in a predetermined display area among displayable areas of a display device and a second state for performing processing to generate video data for display in a second display area not identical to the first display area, on the basis of the rewritten data.

According to still another aspect of the present invention, a program for generating video data for presenting a display includes a step of performing a first processing to generate video data for display in a first display area among displayable areas of a display device. The program also includes a step of performing a second processing video data for display in a second display area not identical to the first display area. In performing predetermined operations in the first and second processing steps, the number of the predetermined operations per unit time executed to generate the video data for display in the second display area be lower than the number of the predetermined operations per unit time executed to generate the video data for display in the first display area.

According to a further aspect of the present invention, there is provided a display unit, comprising the aforementioned signal processing apparatus and a display device for presenting a display based on the video data. Examples of the display device include a field emission display in which a field-emission element is used as a display element, a plasma display in which a plasma cell is used as a display element, a liquid crystal display in which a liquid crystal cell is used as a display element, an electro-luminescent display in which an electro-luminescent element is used as a display element, or a cathode ray tube (CRT).

According to another aspect of the invention, a signal processing apparatus includes a plurality of broadcast receivers for receiving, tuning in to, and demodulating a transmission signal. The apparatus also includes for storing broadcast data tuned in to, and demodulated by, the broadcast receivers in predetermined areas. A classification unit in the apparatus includes complete classification means for classifying data stored in the storage means into all of video, audio, data broadcasts, and control data and simplified classification means for classifying the data stored in the storage means into a part of video, audio, data broadcasts, and control data, the classification unit writing the classified data into the storage means again. The apparatus also includes a video decoding unit including high resolution video decoding means for processing high resolution video data in high resolution and low resolution video decoding means for decoding the high resolution video data in low resolution, the video decoding unit decoding the video data classified by the classification unit.

The classification unit may classify data of a plurality of broadcast programs stored in the storage means sequentially, only by a single classification means.

The low resolution video decoding means may decode only the first image to be referenced in high resolution and may decode other images in low resolution.

In yet a further aspect of the present invention, a signal processing apparatus includes a plurality of broadcast receivers for receiving, tuning in to, and demodulating a transmission signal. The apparatus also includes storage means for storing broadcast data tuned in to and demodulated by the broadcast receivers in predetermined areas. The apparatus also includes classification means for classifying the broadcast data stored in the storage means into video, audio, data broadcasts, and other control data, and storing them into the storage means again. Video decoding means in the apparatus decodes the video data classified by the classification means. Finally, there is a controller in the apparatus for changing types of data classified by the classification means according to a layout on a display screen and for changing resolution at which the video decoding means can process data.

This application also discloses an apparatus wherein the video decoding means decodes only the first image to be referenced in high resolution without fail.

BRIEF DESCRIPTION OF THE DRAWINGS

FIG. 5 is an illustration of a P&P display.

DESCRIPTION OF THE PREFERRED EMBODIMENTS

Figure 1:
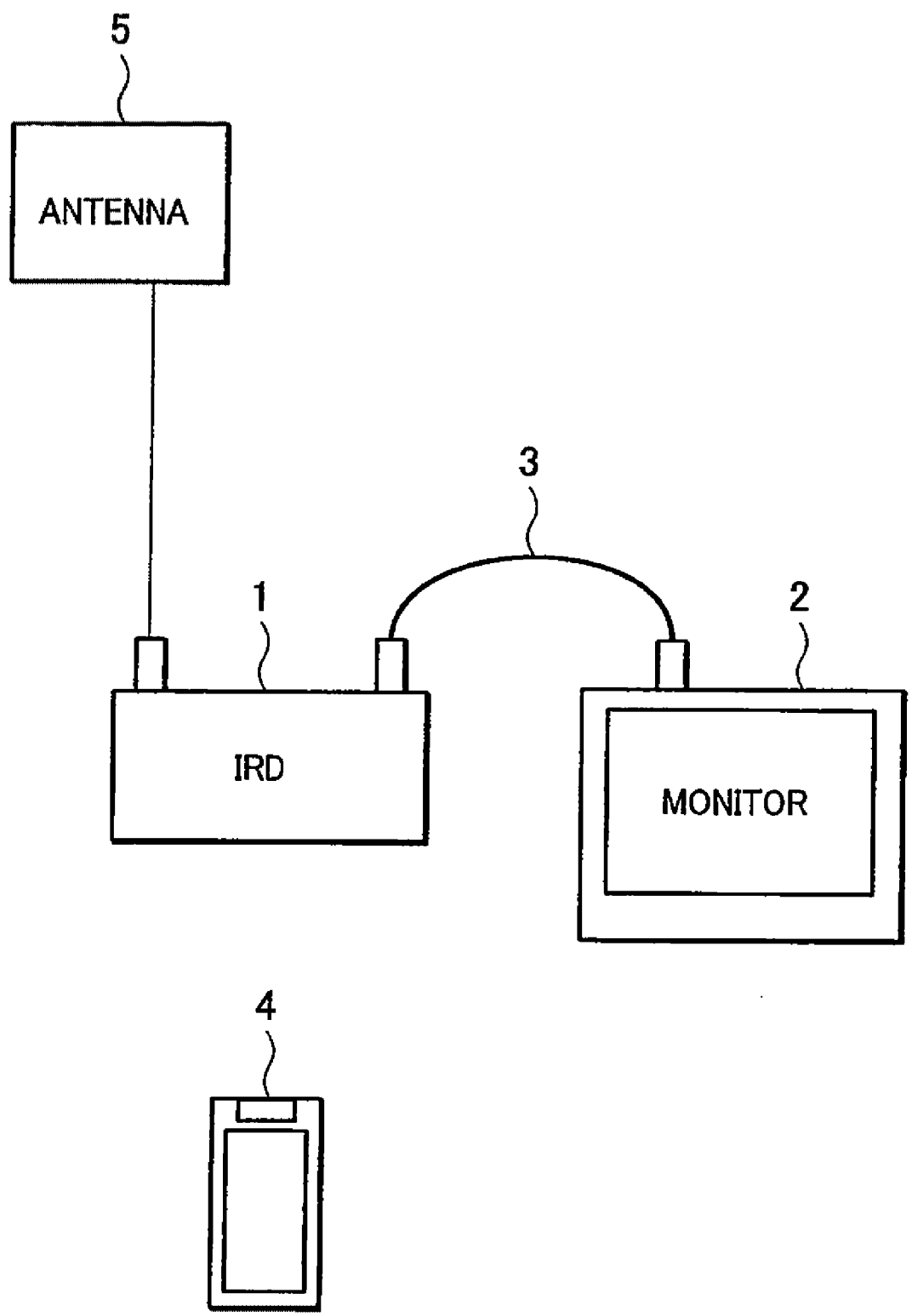
FIG. 1 is a diagram illustrating a system configuration according to a first embodiment of the present invention.

Referring to FIG. 1, there is shown an illustrative system configuration in digital broadcast reception. This system comprises an integrated receiver/decoder (IRD) 1 for receiving digital broadcasts and outputting a result of receiving a plurality of programs, a monitor 2 for viewing video or listening to audio of the IRD 1, a cable 3 for transmitting video and audio signals between the IRD 1 and the monitor 2, a remote controller 4 for transmitting an instruction to the IRD 1, and an antenna 5 for receiving satellite, terrestrial, or other digital TV broadcast signals.

Figure 2A:
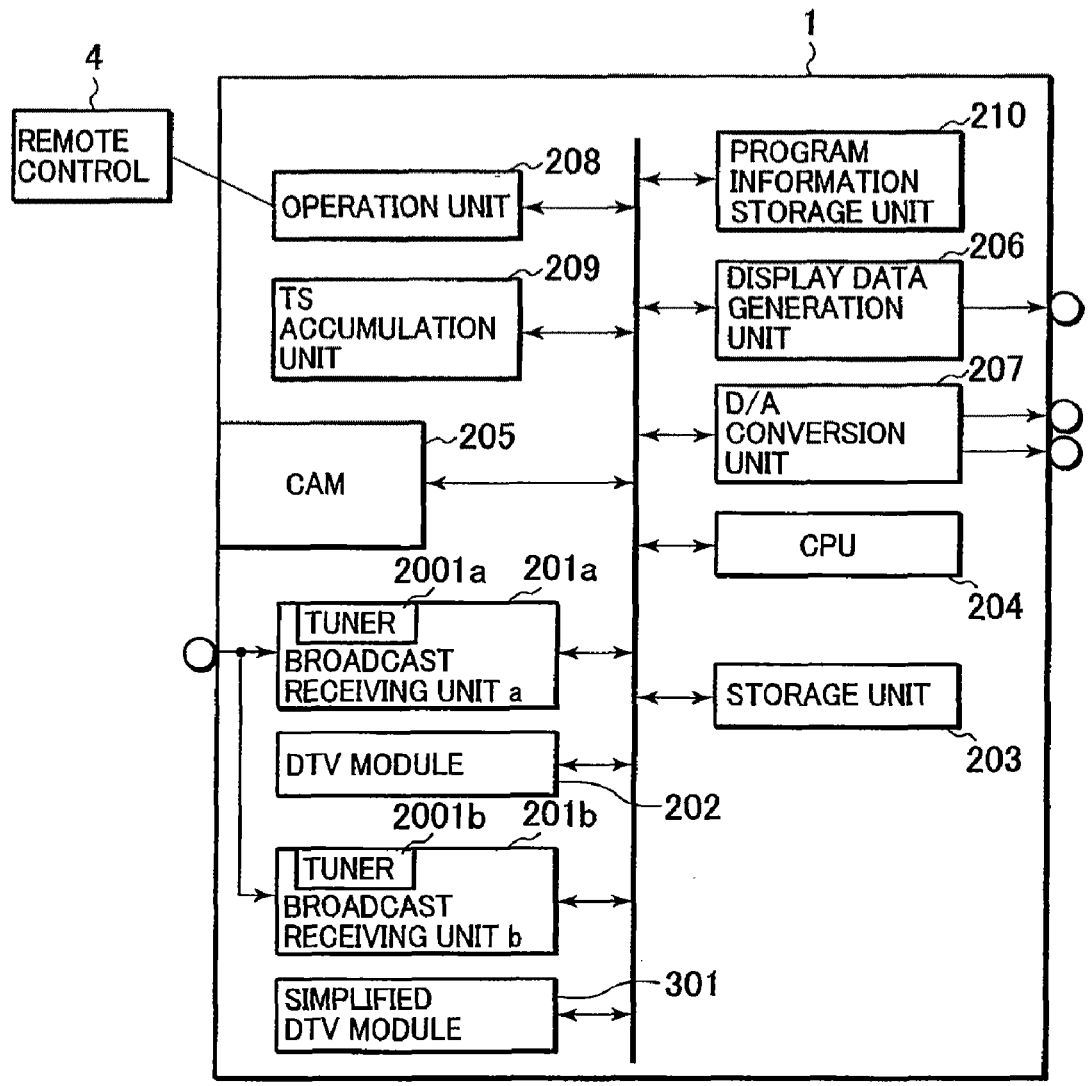
FIGS. 2A-2C are diagrams illustrating a first embodiment of an IRD configuration.
Figure 2B:
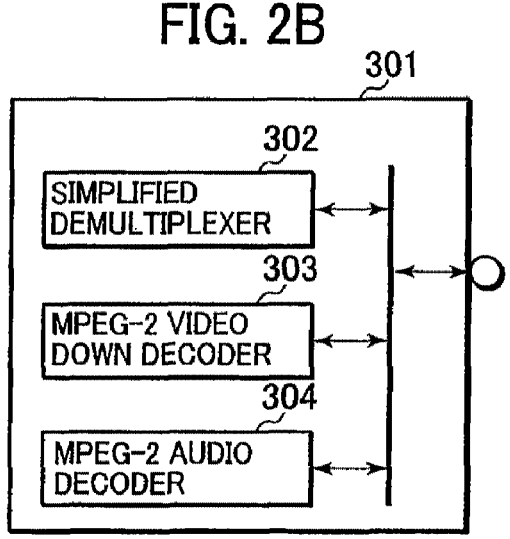
Figure 2C:
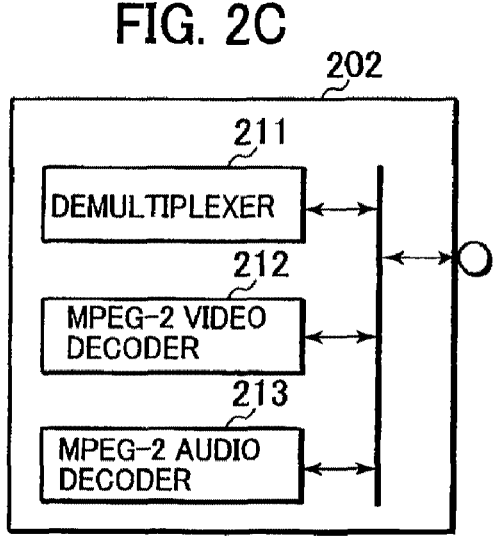

FIGS. 2A-2C illustrate a configuration of the IRD 1 for receiving digital broadcasts.

The IRD 1 includes a broadcast receiving unit 201*a*, a broadcast receiving unit 201*b*, a DTV module 202, a simplified DTV module 301, a storage unit 203, a CPU 204, a conditional access module (CAM) 205, a display data generation unit 206, a D/A conversion unit 207, an operation unit 208, a TS accumulation unit 209, a program information storage unit 210, and buses for transmitting signals among them.

The broadcast receiving unit 201*a* has a tuner 2001*a* for tuning in to a digital broadcast signal input from the antenna 5 and outputs TS data. Likewise, the broadcast receiving unit 201*b* has a tuner 2001*b* for tuning in to a digital broadcast signal input from the antenna 5 and outputs TS data. The DTV module 202 accepts input of the TS data output from the broadcast receiving unit 201*a* via the storage unit 203. The DTV module 202 demultiplexes the input TS data and outputs selected control data. The video data and audio data picked out by the demultiplexing are decoded and then output.

A configuration of the DTV module 202 is shown in FIG. 2C. The DTV module 202 includes a demultiplexer 211 for picking out data corresponding to packet identifiers (PID) by demultiplexing packet data constituting the TS data based on the packet identifiers (PID), an MPEG-2 video decoder 212 for decoding the video data picked out by the demultiplexer 211 and outputting the decoded video data, and an MPEG-2 audio decoder 213 for decoding the audio data picked out by the demultiplexer 211 and outputting the decoded audio data. The demultiplexer 211 classifies and outputs data of video data, audio data, data broadcasts, program information, and the like according to identifiers of the input packet data.

The simplified DTV module 301 accepts input of TS data output from the broadcast receiving unit 201b via the storage unit 203. The simplified DTV module 301 demultiplexes the input TS data and decodes the video data and the audio data picked up by the demultiplexing. The DTV module 301 outputs the decoded audio data, the video data decoded by down-sampling, and data necessary for reproducing the video data and the audio data in other data.

As shown in FIG. 2B, the simplified DTV module 301, which has a simplified function in comparison with the DTV module 202, includes a simplified demultiplexer 302, an MPEG-2 video down decoder 303, and an MPEG-2 audio decoder 304.

The simplified demultiplexer 302, which has a simplified function in comparison with the demultiplexer 211, PID-filters the TS data stored in the storage unit 302, except PIDs including overlapping program information from all PIDs, and classifies the data into various data. The MPEG-2 video down decoder 303 outputs video data at a resolution lower than the resolution of the video data output from the MPEG-2 video decoder 212. The MPEG-2 video down decoder 303 decodes the MPEG-2 video data picked up by the classification with the simplified demultiplexer 302. Particularly, if the input MPEG-2 video data has been broadcasted in high resolution, sampling of all components except the high-frequency components of a DCT coefficient (so-called down-sampling) is performed, and the data is decoded into broadcast data at substantially standard resolution. If the MPEG-2 video data has been broadcasted in standard resolution, it is decoded as usual.

Down-sampling reduces the number of predetermined operations, including an inverse DCT operation, necessary for displaying a single image. Therefore, throughput of the MPEG-2 video down decoder 303 can be lower than that of the MPEG-2 video decoder 212.

This is because the MPEG-2 video decoder 212 requires enough capacity to output high resolution video data continuously regarding predetermined operations, So the number of predetermined operations that the MPEG-2 video down decoder 303 needs to execute per unit time is less than that which the MPEG-2 video decoder 212 needs to execute.

Specifically, a video down decoder having a smaller chip size is used for the MPEG-2 video down decoder 303. If software is used to perform decoding processing, the same size processor used for the MPEG-2 video down decoder 303 can be used for the MPEG-2 video decoder 212. In this condition, the leftover power of the processor used for the MPEG-2 video down decoder 303 can be used to perform an operation other than decoding. The MPEG-2 audio decoder 304 decodes the MPEG-2 audio data picked out during classification with the simplified demultiplexer 302.

The storage unit 203 temporarily stores the TS data output from the broadcast receiving unit 201a until it is output to the DTV module 202 and temporarily stores the TS data output from the broadcast receiving unit 201b until it is output to the DTV module 301. The storage unit 203 stores video data, audio data, PID-filtered data broadcasts, program information, or other data output from the DTV module 202 and the DTV module 301.

The central processing unit (CPU) 204 controls the components of the IRD 1. Specifically, it decodes various table data (PAT, NIT, PMT, BAT, SDT, EIT, TOT, and CAT) as program information data stored in the storage unit 203 and data broadcast data, outputs information to be displayed to the display data generation unit 206, and causes data to be stored as program information data to be stored in the storage unit 203.

The CAM 205 contains an IC card reader composed of a CPU, a ROM, a RAM and the like. The CAM 205 causes the demultiplexer 211 and the demultiplexer 302 to classify encrypted TS by using a cipher key and a decryption program included in the IC card.

The display data generation unit 206 combines the decoded video data stored in the storage unit 203 with an image plotted based on display data created by the CPU 204, and converts it to a signal format conforming to an NTSC or other display unit.

The D/A conversion unit 207 performs a digital-analog conversion for outputting the decoded audio data stored in the storage unit 203 as audio signals such as stereo sounds.

The operation unit 208 accepts operation signals generated by operating the remote controller 4 or the like, for example, for selecting a channel. While the remote controller 4 is connected to the operation unit 208 via a fixed line in FIG. 2A, radio communication such as infrared data communication may be used for the connection.

The TS accumulation unit 209 accumulates TS data output from the broadcast receiving units 201a and 201b, and outputs the accumulated TS data.

The program information storage unit 210 stores various table data processed by the CPU 204 and stored in the storage unit 203 as program information for a program selection. The program information storage unit 210 has a storage device that maintains its contents even after turning off a power supply of the IRD 1. Thus, the program information remains after turning off the power supply of the IRD 1.

A user operates the remote controller 4 or other operation devices to view or listen to a satellite, CATV, terrestrial, or other digital broadcast. A signal for designating a channel generated by operating the operation device is accepted by the operation unit 208 and transmitted to the CPU 204. To select the designated channel (service ID), the CPU 204 presets a frequency, a TS ID, or the like at one of the broadcast receiving units 201a or 201b. These settings cause a signal having a predetermined frequency and/or TS ID to be selected out of signals input from the antenna 5 and causes the selected signal to be converted to TS data. The demultiplexer 211 classifies the TS data from broadcast receiving unit 201a into video data, audio data, and other data. The video data is decoded by the MPEG-2 video decoder 212, and output as decoded video data. The audio data is decoded by the MPEG-2 audio decoder 213, and output as decoded audio data. Other data is transferred to the CPU 204 via the storage unit 203.

In the present application, the term "decoding" means converting a signal submitted to some conversion processing such as encryption or compression and acquiring a desired signal. To decode the encrypted TS data, a cipher key and a decryption program are needed. In this embodiment, the CAM 205 processes the cipher key and the decryption program.

The MPEG-2 video decoder 212 decodes a video signal compressed in the MPEG system and outputs it to the storage unit 203. The decoded video data is sent from the storage unit 203 to the display data generation unit 206. The display generation unit 206 converts it to a display signal. The display signal causes a video display in the monitor 2 connected via the cable 3.

The MPEG-2 audio decoder 213 decodes the audio signal compressed in the MPEG system and outputs it to the D/A conversion unit 207. The decoded audio data is D/A-converted by the D/A conversion unit 207 and output as left and right channel signals. The audio signals are reproduced using a speaker connected via the cable 3.

At that time, the broadcast receiving unit 201a, a first group of the DTV module 202 including the demultiplexer 211, the MPEG-2 video decoder 212, and the MPEG-2 audio decoder 213, the broadcast receiving unit 201b, and a second group of the DTV module 301 including the demultiplexer 302, the MPEG-2 video down decoder 303, and the MPEG-2 audio decoder 304, operate independently of each other. The monitor is capable of displaying video by using the first group and video by using the second group simultaneously. The CPU 204 generates a signal for controlling a video output method such as a 2-screen output or an audio output method based on a control signal generated by a user's operation of the remote controller 4. The control signal from the CPU 204 controls the display data generation unit 206 and the D/A conversion unit 207, thereby allowing a user to view or listen to a plurality of programs at a time.

For later, time-shifted viewing of a received and saved broadcast by reproducing the saved broadcast at a desired time for viewing, it is necessary to accumulate TS data output from one of the broadcast receiving units 201a or 201b in the TS accumulation unit 209. This is accomplished the CPU 204 instructing that TS data be accumulated from one of the broadcast receiving units 201a and 201b into the TS accumulation unit 209. When reproducing the saved TS data, the CPU 204 instructs one of the DTV module 202 and the simplified DTV module 301 to output the TS data from the TS accumulation unit 209. In addition, the CPU 204 instructs the DTV module 202 not to accept two inputs of TS data at a time. This enables simultaneous viewing of the time-shifted reproduction of the broadcast using the accumulation unit 209 and live reproduction.

Figure 3:
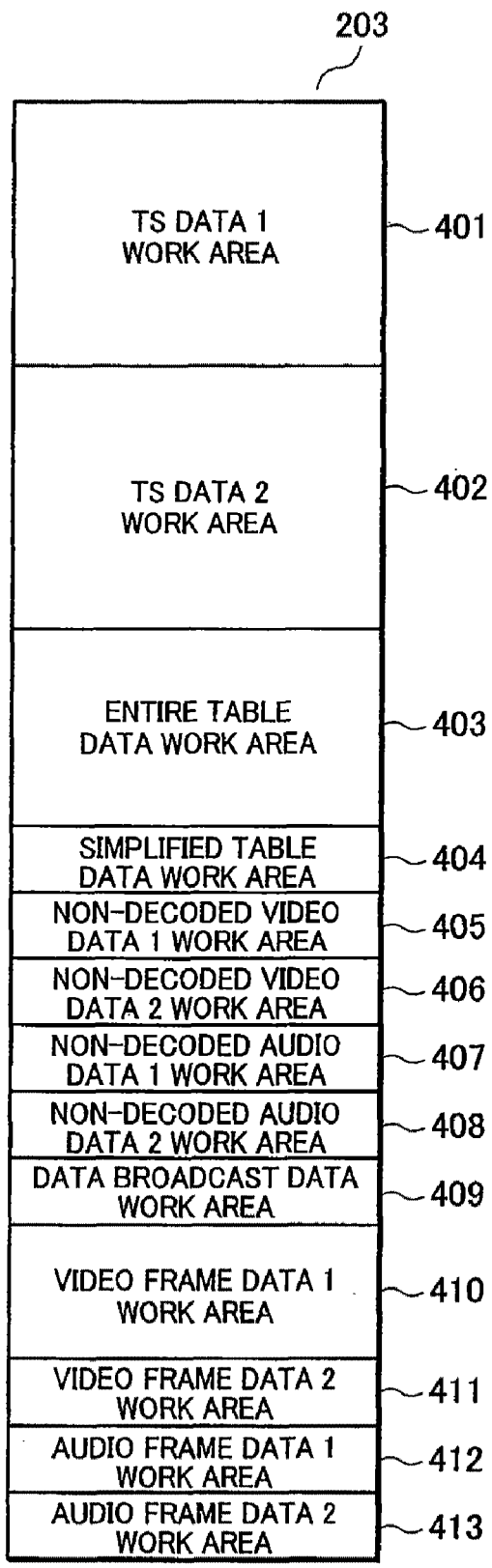
FIG. 3 is an illustration of an example of work areas allocated in a storage unit.

FIG. 3 is a diagram illustrating an example of a work area allocation in the storage unit 203.

A TS data 1 work area 401 is for use in temporarily storing TS data output from the broadcast receiving unit 201a or 201b. A TS data 2 work area 402 is for use in temporarily storing TS data output from the broadcast receiving unit 201a or 201b not using the TS data 1 work area 401.

An entire table data work area 403 is for use in storing program information data classified by the demultiplexer 211. A simplified table data work area 404 is for use in storing TS-specific program information data such as PAT, CAT, and PMT, classified by the simplified demultiplexer 302.

A non-decoded video data 1 work area 405 is for use in storing video data already classified by the demultiplexer 211, or the simplified demultiplexer 302, and not decoded yet. A non-decoded video data 2 work area 406 is for use in storing video data already classified by the demultiplexer 211, or the simplified demultiplexer 302, which is not using the non-decoded video data 1 work area 405, and not decoded yet.

A non-decoded audio data 1 work area 407 is for use in storing audio data already classified by the demultiplexer 211 or the simplified demultiplexer 302 and not decoded yet. A non-decoded audio data 2 work area 408 is for use in storing audio data already classified by the demultiplexer 211, or the simplified demultiplexer 302, which is not using the non-decoded audio data 1 work area 407, and not decoded yet.

A data broadcast data work area 409 is for use in storing data broadcast data classified by the demultiplexer 211.

A video frame data 1 work area 410 is for use in storing high resolution video data decoded by the MPEG-2 video decoder 212. A video frame data 2 work area 411 is for use in storing standard resolution video data generated by down-sampling and decoding a high resolution broadcast by using the MPEG-2 video down decoder 303 or standard resolution video data generated by decoding a standard resolution broadcast by using the MPEG-2 video down decoder 303.

An audio frame data 1 work area 412 is for use in storing audio data decoded by the MPEG-2 audio decoder 213. An audio frame data 1 work area 413 is for use in storing audio data decoded by the MPEG-2 audio decoder 304.

TS data output from the broadcast receiving units 201a and 201b are temporarily stored in the TS data 1 work area 401 and the TS data 2 work area 402 separately. The CPU 204 reserves TS data work areas for them, determines which of the broadcast receiving units 201a and 201b should use which area, and controls them. Furthermore, the CPU 204 causes the video, audio, PID-filtered data broadcasts, program information, and other data decoded by the DTV module 202 to be stored. The CPU 204 also causes video, audio, PID-filtered program information not overlapping, and other data decoded by the simplified DTV module 301, to be stored in corresponding work areas.

In this embodiment, a 2-screen simultaneous display function such as P-in-P or P&P is enabled by using the DTV module 202 and the simplified DTV module 301, constituting two sets of digital broadcast reproduction means having different functions.

First, PinP will be described below.

Figure 4:
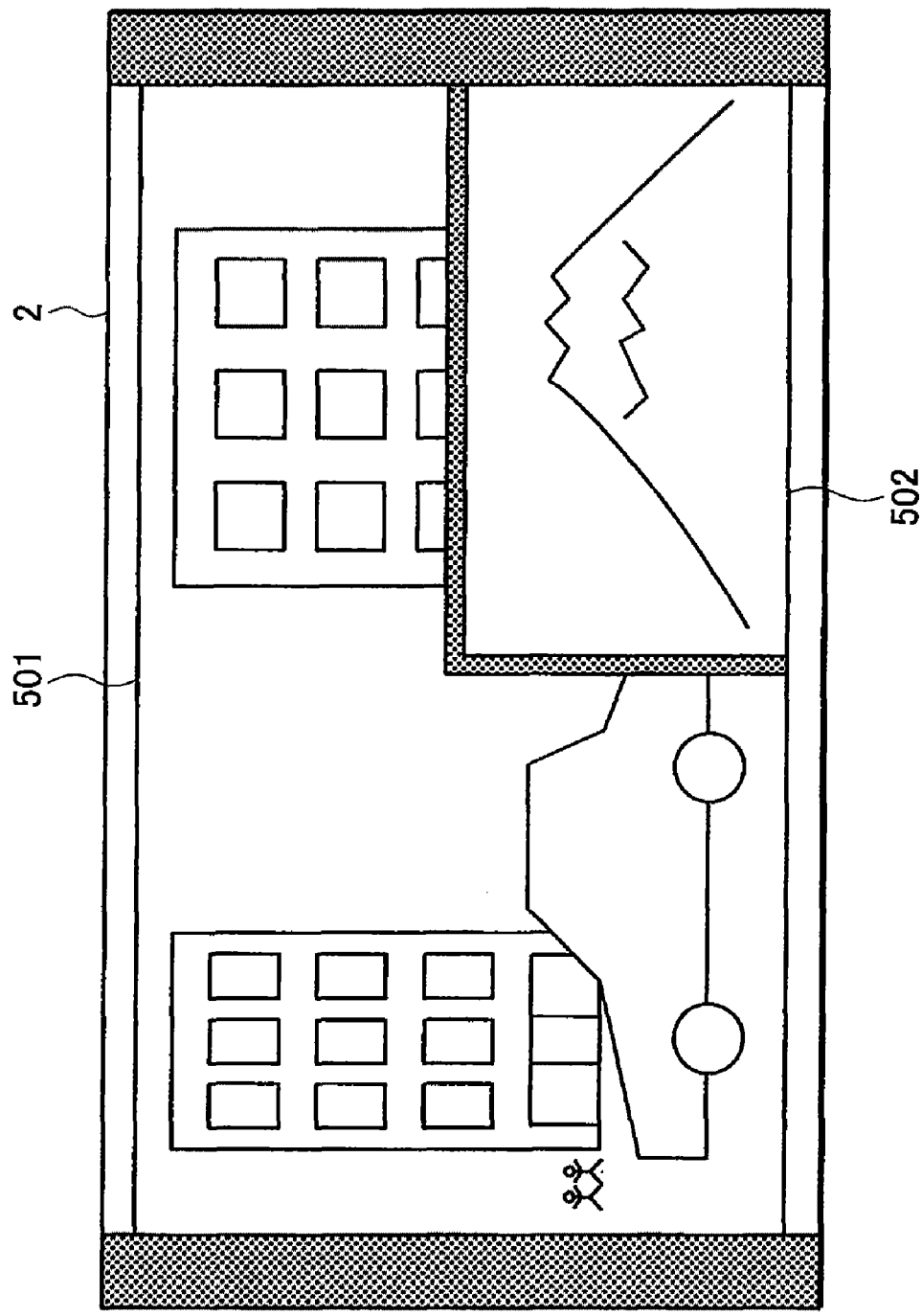
FIG. 4 is an illustration of a P-in-P display.

FIG. 4 shows an illustrative display of P-in-P, where both of the two input video data are high resolution video data.

A high resolution image 501 is displayed based on high resolution video data obtained by decoding high resolution input video data using the decoder 211 of the DTV module 202. This video data is output as video data for displaying the image by using the entire displayable area of the monitor 2, which is a display device, as a display area, referred to herein as a first display area.

A low resolution image 502 is displayed based on low resolution video data obtained by decoding high resolution input video data using the decoder 303 of the simplified DTV module 301. This video data is for use in displaying the image in a second display area smaller than, and located within the first display area. Since no display area is superimposed on the second display area, the second display area corresponds to the area where the low resolution image 502 is actually displayed. The second display area is superimposed on the first display area and therefore a part of the first display area (a part not overlapping with any other display area) is an area for displaying the high resolution image 501 as an actual image.

For P-in-P, the CPU 204 determines an allocation to a broadcast of the full-screen display and a broadcast of the reduced screen display, based on which TS data work areas in the storage unit 203 are used by the DTV module 202 and the simplified DTV module 301. According to this instruction, the DTV module 202 classifies TS data of the broadcast displayed full-screen as the high resolution image 501 and decodes video data and audio data picked out by the classification. The simplified DTV module 301 classifies TS data of the broadcast displayed on the reduced screen as the low resolution image 502 and decodes video data and audio data picked out by the classification. These decoding results are stored in the storage unit 203. The display data generation unit 206 allocates the screen areas to the video data and the monitor 2 displays video. Based on the audio data, a sound/voice of the full-screen display is output from the speaker attached to the monitor 2. A sound/voice of the broadcast for the reduced screen display can be arbitrarily picked up from an external output terminal of the IRD 1. Since both of the two input video data in the TS data are high resolution video data, no special treatment is performed for the video data classified by the demultiplexer before decoding.

Switching between the high resolution image 501 and the low resolution image 502 is carried out by changing the TS data work areas. In response to a user's instruction to switch between the images, the CPU 204 changes TS data work areas used by the DTV module 202 and the simplified DTV module 301. If, however, the CPU 204 attempts to switch the screen quickly, the displayed image may be distorted when it is definitely going to be switched. To prevent the distortion, previously decoded images are used. In the MPEG-2 video down decoder 303, which acquires the low resolution video data by decoding, if only an intra-coded (I) picture relatively easy to decode has been decoded in high resolution, it can be used as an image at the moment of switching. The video data decoded by the MPEG-2 video decoder 212 is scaled so as to display a reduced image in the display data generation unit 206.

Data such as the program information is evaluated if it is picked up by the demultiplexer 211. The simplified demultiplexer 302 classifies data only for table data necessary for decoding.

In this manner, the high resolution image 501 can be displayed as a high resolution image based on the video data obtained by decoding data by using the MPEG-2 video decoder 212, and the low resolution image 502 can be displayed as a low resolution image based on the video data obtained by decoding data by using the MPEG-2 video down decoder 302.

The following describes P&P.

FIG. 5 shows an illustrative P&P display. In this embodiment, both of the two input video data are assumed high resolution video data.

A high resolution image 601 is displayed on the monitor 2 based on video data decoded by the DTV module 202. A low resolution image 602 is displayed based on video data decoded by the simplified DTV module 301.

For P&P, the CPU 204 controls the allocation to a broadcast of a main (left) screen display and a broadcast of a sub (right) screen display. Specifically, the CPU 204 allocates the display areas by controlling the display data generation unit 206. Furthermore, the CPU 204 determines the allocation to the broadcast of the large screen display and the broadcast of the small screen display, based on which TS data work areas in the storage unit 203 are used by the DTV module 202 and the simplified DTV module 301.

According to this instruction, the DTV module 202 classifies TS data of the broadcast displayed on the large screen as the high resolution image 601 and decodes video data and audio data picked up by the classification. The display data is a result of decoding the high resolution video that has been reduced by scaling. The simplified DTV module 301 classifies TS data of the broadcast displayed on the small screen as the low resolution image 602 and decodes video data and audio data obtained by the classification. The display data is a result of decoding the low resolution video that has been directly displayed or reduced by scaling. Both of the video data in the TS data themselves are high resolution video data, and therefore no special treatment is performed for the video data classified by the demultiplexer before decoding. These decoding results are stored in the storage unit 203.

The display data generation unit 206 then scales the decoding results and allocates the screen areas to them, and the monitor 2 displays video. Based on the audio data, a sound/voice of the large screen display or of the main screen (left) is output from the speaker attached to the monitor 2. A sound/voice of the broadcast for the small screen display or the sub screen (right) can be arbitrarily picked up from an external output terminal of the IRD 1.

Switching between the high resolution image 601 and the low resolution image 602 is carried out by changing the TS data work areas, in the same manner as for P-in-P. In response to a user's instruction of changing a display size, the CPU 204 changes TS data work areas used by the DTV module 202 and the simplified DTV module 301. If, however, the CPU 204 attempts to switch the screen quickly, the displayed image may be distorted when it is definitely going to be switched. To prevent the distortion, their previously decoded images are used. In the MPEG-2 video down decoder 303 for decoding the low resolution video, if only an intra-coded (I) picture relatively easy to decode has been decoded in high resolution, it can be used as an image at the moment of switching. The video data decoded by the MPEG-2 video decoder 212 is scaled so as to display a reduced image in the display data generation unit 206.

Data such as the program information is evaluated if it is classified by the demultiplexer 211. The simplified demultiplexer 302 classifies data only for table data necessary for decoding.

As mentioned above, the high resolution image 601 is displayed by using video data scaled so as to display a reduced image from the high resolution video data decoded by using the MPEG-2 video decoder 212. The low resolution image 602 is displayed by directly using the low resolution video data decoded by using the MPEG-2 video down decoder 302 or displayed by using video data scaled so as to display a further reduced image.

In this manner, it becomes possible to display two screens simultaneously without particular distinction from a configuration having two expensive DTV modules, by using the DTV module 202 that handles the high resolution video data directly and the simplified DTV module 301 that decodes high resolution video data to low resolution video data.

The MPEG-2 video decoder 212 forming the first decoder can be a circuit manufactured as a signal processing circuit dedicated to a video decoder. Alternatively, it can be a storage circuit storing a program for performing the above decoding processing or any other usage, and may be combined with a signal processing circuit capable of executing the program. The same is true of the MPEG-2 video down decoder 303 and the MPEG-2 audio decoders 213 and 304.

The demultiplexer 211 can be a circuit manufactured as a signal processing circuit dedicated to a demultiplexer or can be a storage circuit storing a program for performing the above demultiplex processing or any other usage and be combined with a signal processing circuit capable of executing the program. The same is true of the demultiplexer 302. The demultiplexer 211, the video decoder 212, the audio decoder 213, the demultiplexer 302, the video decoder 303, and the audio decoder 304 can be arranged as a circuit in which at least some of them are integrated.

The following describes a second embodiment. In this embodiment, a processor 702 as a signal processing circuit capable of executing a program performs demultiplexing, video decoding, and audio decoding by executing programs stored in a ROM 703.

Figure 6A:
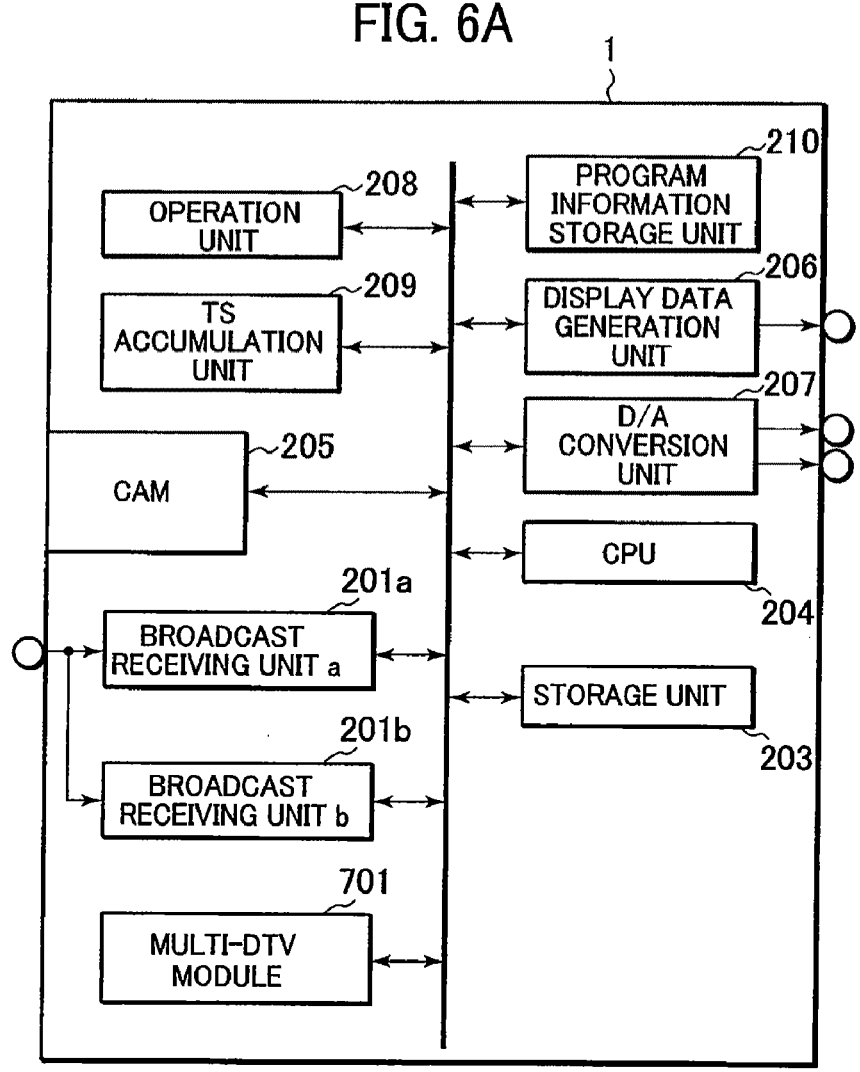
FIGS. 6A and 6B are IRD configuration diagrams in a second embodiment.
Figure 6B:
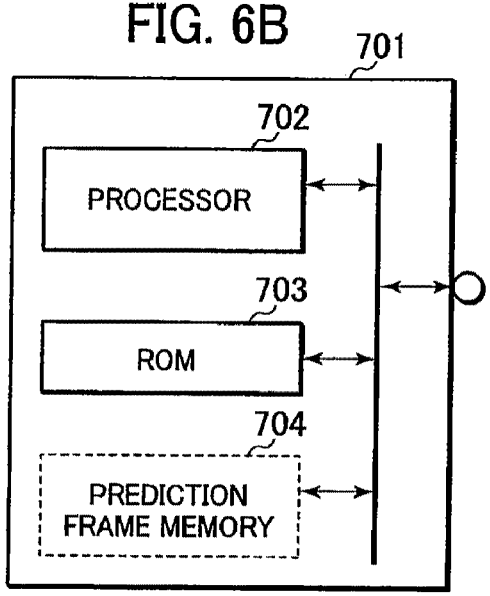

FIGS. 6A-6B show an illustrative configuration of the IRD 1 in this embodiment, where reference numerals 201 and 203 to 210 indicate the same parts as in the first embodiment.

A multi-DTV module 701 can change functions of a demultiplexer, a MPEG-2 video decoder, and a MPEG-2 audio decoder according to settings of a viewing method. The processor 702 is a CPU, a DSP, a media processor, or the like, capable of performing the functions of the demultiplexer, the MPEG-2 video decoder, the MPEG-2 audio decoder, or the like, by means of software. The ROM 703 is a storage unit, such as a flash ROM, storing the software of the processor 702.

In the storage unit 203, work areas are allocated to the broadcast receiving unit 201, the demultiplexer formed by the multi-DTV module 701, the MPEG-2 video decoder, and the MPEG-2 audio decoder, in the same manner as in the first embodiment.

Figure 7:
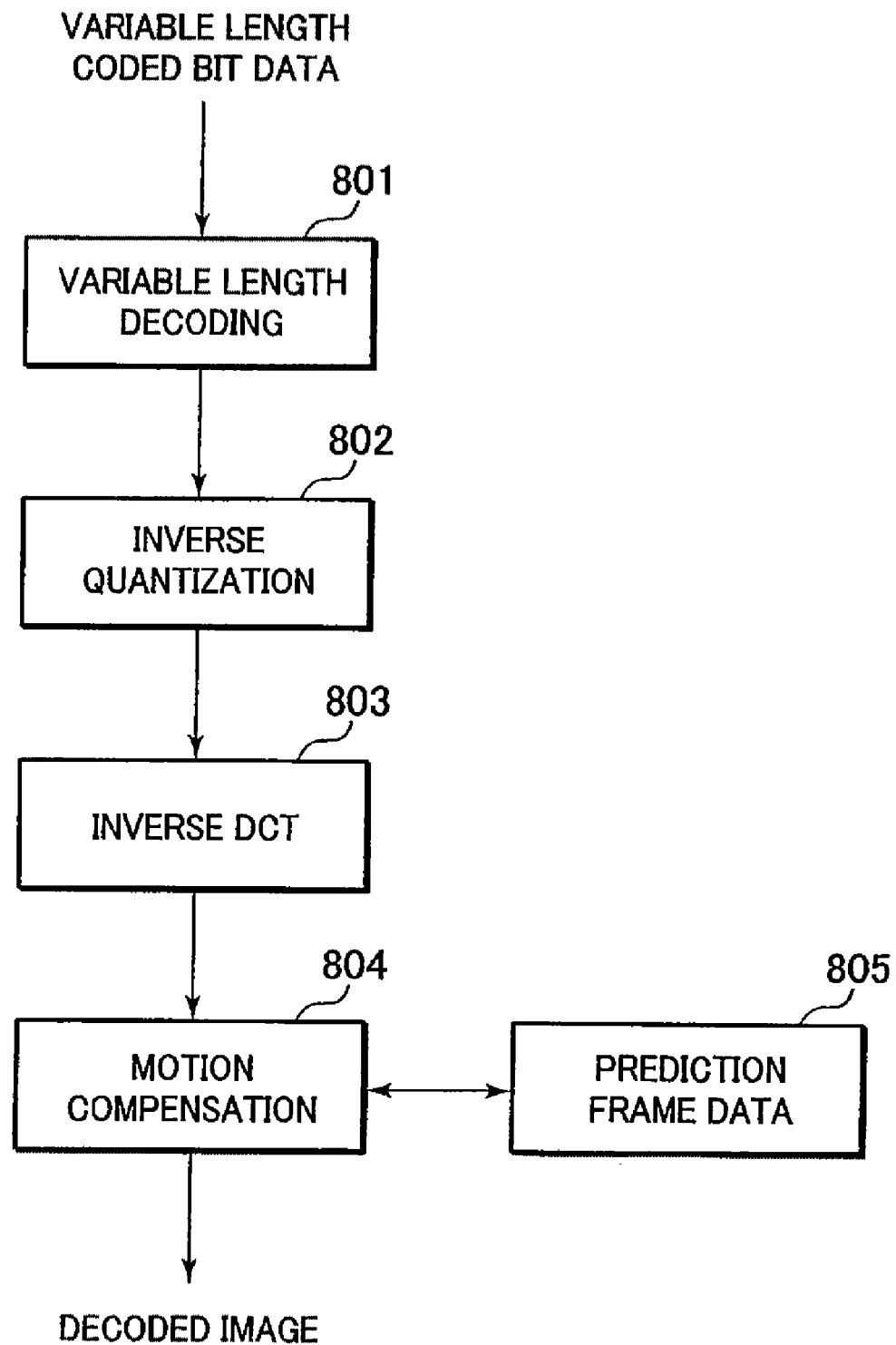
FIG. 7 is an illustration of a processing flow for decoding video.

FIG. 7 illustrates a processing flow of the MPEG-2 video decoder executed by the processor 702.

Variable length bit data, which is video data picked up by the demultiplexer, is variable-length decoded (step 801). Thereafter, it is inverse-quantized by inverse-quantizing 8×8 quantized data and restoring a DCT coefficient (step 802). Thereafter, the data is submitted to inverse DCT processing in which an inverse discrete cosine transform is performed for the 8×8 DCT coefficient (step 803). Subsequently, processing enters a motion compensation step 804. In the motion compensation step 804, for data requiring inter-frame differential data, reference data read from a prediction frame memory 704 is added to input data (step 805), the data is written into the prediction frame memory 704 again, and a decoded image is output. For intra-frame coded data, the input data is written into the prediction frame memory 704 in step 805, and a decoded image is output (step 804). The prediction frame memory 704 is for use in storing a prediction frame in the motion compensation step 804.

An example of an amount of processing in the processor 702 in this embodiment assumes 1080i (1080 pixels×1920 pixels, 30 frames/sec) for a high resolution broadcast, and 480p (480 pixels×720 pixels, 60 frames/sec) for a standard-resolution broadcast. The amount of processing in decoding is proportional to the number of macroblocks as processing units, and therefore an amount of processing of the standard-resolution broadcast is one-third that of the high resolution broadcast.

When the high resolution broadcast is decoded in the order of standard resolution, a method of down-sampling or the like is used. Although there are some known methods of down-sampling for the MPEG-2 video decoder, this embodiment adopts a method in which simply 4×4 (16) low-frequency areas are processed in the DCT coefficients of 8×8 (64) to decrease the amount of processing. By decreasing the amount of valid data to one-fourth by rounding the 8×8 data down to 4×4 by variable length decoding 801 and padding the remaining portion with zeros, it becomes possible to simplify the subsequent processing and to decrease the number of operations in each processing step after the variable length coding. The amount of processing becomes equal to or less than that of the standard-resolution broadcast.

Programs contained in the ROM 703 include a first program for use in displaying a single image by using the entire displayable area of the monitor, and a second program for use in displaying a plurality of images in the display area of the monitor in this embodiment. The first program executes a processing flow shown in FIG. 7 at a high resolution corresponding to the entire displayable area of the monitor. The second program executes parallel processing of (i) the processing flow in FIG. 7 at a resolution equal to the entire displayable area of the monitor, or at a resolution corresponding to a first display area smaller than this, and (ii) the processing flow in FIG. 7 at a resolution corresponding to a second display area smaller than the displayable area of the monitor. In other words, the second program forms a decoder capable of outputting video data at a predetermined resolution, and a decoder capable of outputting video data at a resolution lower than the predetermined resolution.

For a single-screen display, the processor 702 executes the processing flow in FIG. 7 at a high resolution by executing the first program. In this embodiment, the same demultiplex processing as in the complete demultiplexer described in the first embodiment is performed by executing the program for the single-screen display.

Figure 8:
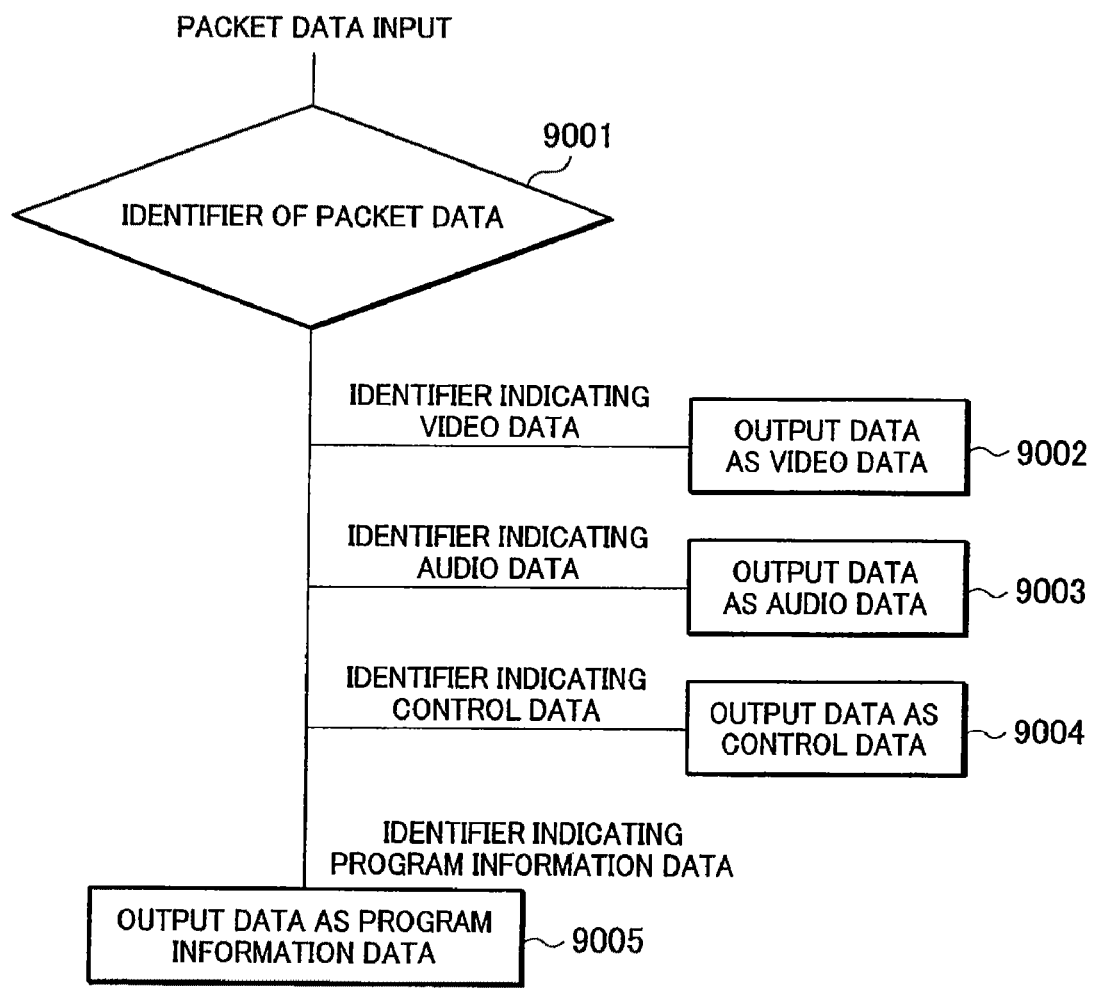
FIG. 8 is a diagram showing demultiplex processing.

FIG. 8 illustrates the processing flow for demultiplex processing in the second embodiment. First, packet data received by the broadcast signal receiving unit 201a is supplied to the multi-DTV module 701 via the storage unit 203. Identifiers of the packet data are determined (step 9001). Subsequently, plural types of data are picked up based on the identifiers. Specifically, video data, audio data, control data, and program information data are output as different types of data, respectively. In other words, if the identifier indicates video data, data is output as video data (step 9002). If the identifier indicates audio data, data is output as audio data (step 9003). If the identifier indicates control data, data is output as control data (step 9004). The control data in this embodiment includes data for reproducing video data or audio data at an appropriate timing. If the identifier indicates program information data, data is output as program information data (step 9005). Audio data is decoded by executing the program, too.

For a 2-screen display, the processor 702 executes the second program to execute both the processing flow in FIG. 7 for performing high resolution processing, and the processing flow in FIG. 7 for performing processing in lower resolution than the above processing flow, in parallel for signals received by the broadcast signal receiving unit 201a and the broadcast signal receiving unit 201b, respectively.

In this regard, throughout this application, "the parallel processing of the processing flows" does not mean completely simultaneous processing at the same timings. Rather, it is only necessary for a user to recognize visually simultaneous displays of images based on the signals obtained in the processing flows. Therefore, in the feature of displaying the plurality of screens simultaneously, it is possible to perform the processing in the processing flow in FIG. 7 for obtaining video data for displaying the screens by means of time-sharing processing of the processor 702. This case is also referred to as "parallel processing of the processing flows" in this application.

The demultiplex processing of the packet data corresponding to the main screen is performed following the processing flow in FIG. 8 in the same manner as for the single-screen display. Processing of packet data corresponding to other screens is also performed by executing the program. The program information data, however, is not output if the identifier indicates program information data in the processing flow shown in FIG. 8.

In other words, the processor 702 in this embodiment is capable of forming a complete demultiplexer, a simplified demultiplexer, a high resolution MPEG-2 video decoder, a standard-resolution MPEG-2 video decoder, and a 6-ch MPEG-2 audio decoder (AAC), by which the IRD 1 capable of displaying two screens and standard-resolution four screens can be achieved.

The following describes the processing by giving an example of the 2-screen display in the above configuration.

If the screen layout is changed from a single-screen display achieved by executing the first program to a 2-screen display or the like according to a user's instruction, the CPU 204 reads out corresponding software (the second program) from the ROM 703 to change the function of the processor 702, so that the processor 702 can execute the second program. Preferably, software for the 2-screen display is written into the ROM 703 in advance. It is, however, also possible to add a plural-screen display function in this embodiment later. In this condition, the CPU 204 rewrites data in the ROM 703 to provide the multi-DTV module 701 with a new function. The rewriting is performed by storing software once from a CD-ROM as a storage medium or a network as a storage medium to the storage unit 203 and then writing the software stored in the storage unit 203 into the ROM 703.

For P-in-P shown in FIG. 5, the processor 702 executes a program to operate as a demultiplexer capable of a classification of two TS data, a high resolution MPEG-2 video decoder for decoding the high resolution image 501 for a full-screen display, a low resolution MPEG-2 video decoder for decoding the low resolution image 502 for a reduced screen display, and an MPEG-2 audio decoder for decoding audio. The low resolution MPEG-2 video decoder for the reduced screen display is used to obtain an image of substantially standard resolution, and it downsamples and decodes a high resolution broadcast. For a standard resolution broadcast, it operates as the standard resolution MPEG-2 video decoder, by which a standard resolution image is obtained.

For P&P shown in FIG. 6, the processor 702 executes a program to operate as a demultiplexer capable of a classification of two TS data, a high resolution MPEG-2 video decoder for decoding video for a large screen display, a low resolution MPEG-2 video decoder for decoding video for a small screen display, and an MPEG-2 audio decoder for decoding audio. The low resolution MPEG-2 video decoder for the small screen display is used to obtain an image of substantially standard resolution, and it downsamples and decodes a high resolution broadcast.

Figure 9:
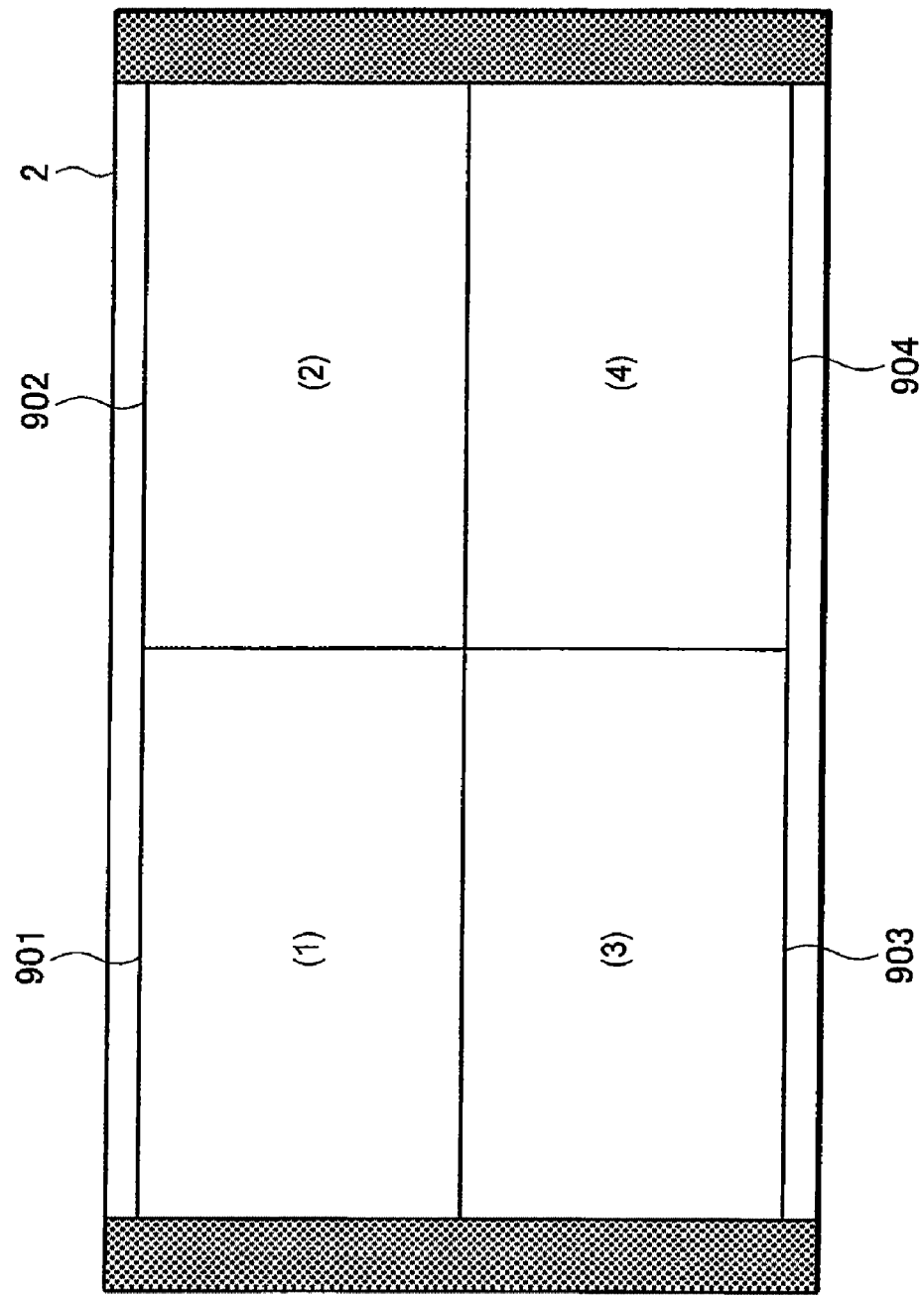
FIG. 9 is an illustration of a 4-screen display in the second embodiment.

The plural-screen display is not limited to the 2-screen display. FIG. 9 shows an example of displaying four screens in standard resolution in the displayable areas by executing a program for executing the 4-screen display in the processor 702.

Reference numerals 901, 902, 903, and 904 in FIG. 9 designate standard resolution images, displayed on monitor 2, decoded by using the multi-DTV module 701.

The processor 702 executes a program to operate as a demultiplexer capable of a classification of two TS data, four standard resolution MPEG-2 video decoders for decoding video of standard resolution broadcasts, and an MPEG-2 audio decoder for decoding audio. For example, in a digital broadcast, a single high resolution broadcast or three standard resolution broadcasts are transmitted in the same TS. For a 4-screen display, six standard resolution video images in total are obtained from two standard resolution broadcast TS data. Four video data selected out of them are decoded.

For presenting three standard resolution broadcasts transmitted in one TS and a single high resolution broadcast transmitted in another TS on four screens simultaneously, the processor 702 executes a program to operate as a demultiplexer capable of a classification of two TS data, three standard resolution MPEG-2 video decoders for decoding video of the standard resolution broadcasts, a low resolution MPEG-2 video decoder for decoding video of the high resolution broadcast to video in the order of standard resolution, and an MPEG-2 audio decoder for decoding audio. The low resolution MPEG-2 video decoder is used to obtain an image of substantially standard resolution, and it downsamples and decodes the high resolution broadcast. The amount of processing of the low resolution MPEG-2 video decoder is almost the same as that of the standard resolution MPEG-2 video decoders.

In this manner, by the formation of the plurality of decoders having different throughputs in the processor 702, it becomes possible to achieve the 2-screen simultaneous display without distinction from the configuration having two expensive DTV modules and further to achieve the IRD 1 capable of displaying four screens simultaneously in standard resolution.

While there have been used the first program for achieving the single-screen display and the second program for achieving the plural-screen display in this embodiment, the present invention is not limited thereto. Specifically, it is also possible to prepare a program capable of the plural-screen display as a single program and to switch resolution parameters of these screens so as to achieve the plural-screen display. In this situation, to achieve the single-screen display, resolution parameters of the screen control parameters other than one screen control parameter should be set to zero.

While the programs have been executed to achieve the single-screen display and the plural-screen display in this embodiment, respectively, the signal processing apparatus according to the present application may also include a signal processing circuit whose operational state may be variable, such as a field programmable gate array (FPGA), a storage unit for storing data for switching the operational states of the signal processing circuit, and a setting circuit for setting the operational states of the signal processing circuit based on the data. In this arrangement, the setting circuit rewrites operating conditions of the signal processing circuit based on the above data to switch the state from displaying the single screen to displaying the plural screens, to switch the state in the reverse direction, and to switch the state from displaying predetermined plural screens to displaying a different number of plural screens.

This application claims priority from Japanese Patent Application No. 2003-395348 filed Nov. 26, 2003, and from Japanese Patent Application No. 2004-335402, filed Nov. 19, 2004, which are hereby incorporated by reference herein.

What is claimed is:

1. A signal processing apparatus, comprising:
    a first demultiplexer for picking out first data corresponding to packet identifiers by demultiplexing packet data constituting TS data based on the packet identifiers for identifying the packet data, and for outputting the first data to a first video decoder; and
    a second demultiplexer for picking out second data corresponding to packet identifiers by demultiplexing packet data constituting the TS data based on the packet identifiers for identifying the packet data, and for outputting the second data to a second video decoder,
    wherein said second demultiplexer picks out the second data corresponding to demultiplexing the TS data except the packet identifiers including overlapping program information from all packet identifiers,
    wherein for the second video decoder, regarding predetermined operations for generating video data by decoding the data, the number of the predetermined operations that can be executed by the second video decoder for each unit time is lower than the number of the predetermined operations that can be executed by the first video decoder for each unit time.

2. The apparatus according to claim 1, further comprising a receiver for receiving data to be input to said first demultiplexer and/or said second demultiplexer.

3. The apparatus according to claim 1, wherein if the data inputted from said second demultiplexer is high definition video data, then the second video decoder generates standard definition video data by sampling of all components except the high-frequency components of a DCT coefficient, and wherein if the data inputted from said second demultiplexer is standard definition video data, then the second video decoder generates standard definition video data by sampling of all components of a DCT coefficient.

* * * * *